United States Patent [19]

Nakaya

[11] 3,909,671

[45] Sept. 30, 1975

[54] SAMPLING OSCILLOSCOPE HAVING MEANS FOR MAGNIFYING A PART OF AN OBSERVED WAVE FORM ALONG THE TIME BASE

[76] Inventor: Naohisa Nakaya, 3463 Izumi, Komae, Tokyo, Japan

[22] Filed: Nov. 16, 1973

[21] Appl. No.: 416,652

Related U.S. Application Data

[63] Continuation-in-part of Ser. No. 165,613, July 23, 1971, abandoned.

[30] Foreign Application Priority Data

July 23, 1970 Japan................................ 45-63902

[52] U.S. Cl................................. 315/395; 315/384
[51] Int. Cl.²........................................ H01J 29/70
[58] Field of Search....... 315/22, 25, 26, 24, 27 TD, 315/27 R, 28–29, 384, 392, 393, 395; 178/7.55 E

[56] References Cited
UNITED STATES PATENTS 3,423,629  1/1969  Best et al............................. 315/25

Primary Examiner—T. H. Tubbesing
Assistant Examiner—J. M. Potenza
Attorney, Agent, or Firm—Robert E. Burns; Emmanuel J. Lobato; Bruce L. Adams

[57] ABSTRACT

A sampling oscilloscope is known, in which a delayed pulse generator is provided to generate delayed pulses successively delayed, by regulatable times, with respect to the period of a synchronous signal by comparison between respective instantaneous levels of a high-speed saw-tooth wave synchronized with the synchronous signal and of a sweep voltage of a cathode-ray tube, and in which a sampled output of an input signal sampled by the delayed pulses is displayed on the screen of a cathode-ray tube by the use of the sweep voltage. In accordance with the principle of this invention, an attenuation circuit is provided before the delayed pulse generator to further attenuate the sweep voltage; a mode switch is provided for switching, for the delayed pulse generator, two paths of the sweep voltage in one of which the attenuation circuit is provided; and the mode switch is switched by a switch controller in response to a switching signal.

10 Claims, 6 Drawing Figures

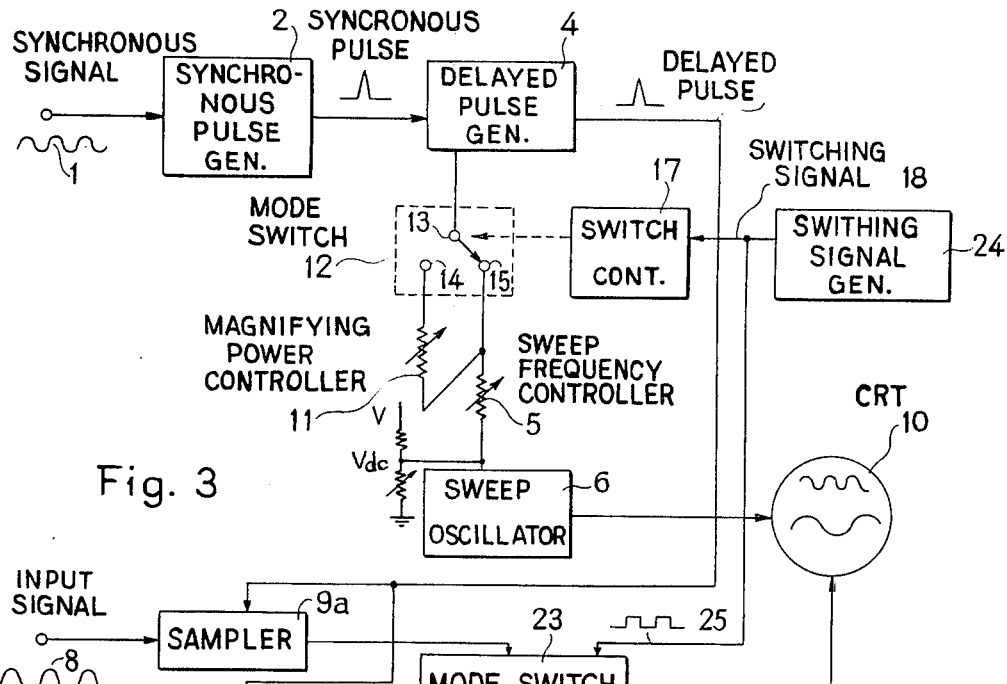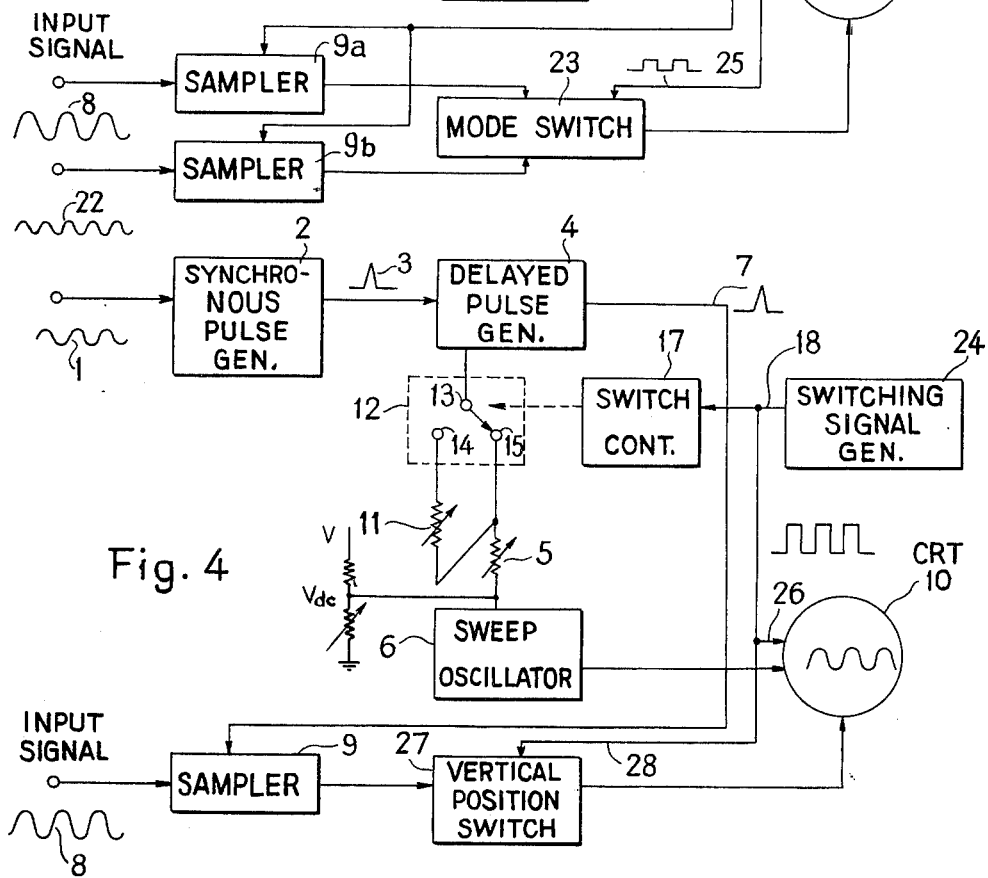

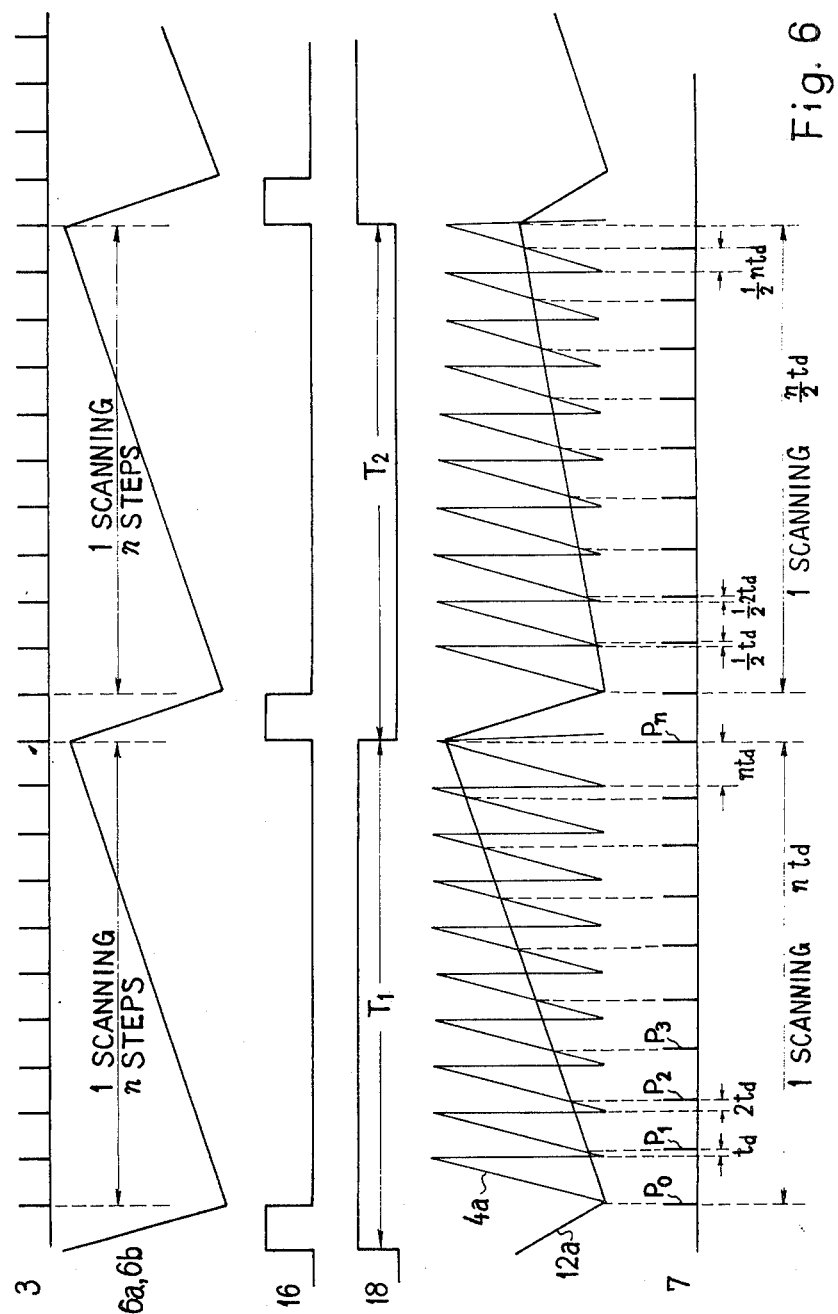

SAMPLING OSCILLOSCOPE HAVING MEANS FOR MAGNIFYING A PART OF AN OBSERVED WAVE FORM ALONG THE TIME BASE

This application is a continuation-in-part of my co-pending application, Ser. No. 165,613 filed on July 23, 1971 and now abandoned.

This invention relates to a sampling oscilloscope and, more particularly, to sampling oscilloscopes having means for magnifying a part of an observed wave form along the time base.

Sampling oscilloscopes having magnification means for magnifying a part of an observed wave form along the time base are known in the art. However, a magnified position on an observed wave form cannot be exactly known in conventional circuits as mentioned below.

An object of this invention is to provide a sampling oscilloscope with a magnification function capable of readily distinguishing a magnified position on a normally observed wave form.

In a conventional sampling oscilloscope, a delayed pulse generator is provided to generate delayed pulses successively delayed, by regulable times, with respect to the period of the synchronous signal by comparison between respective instantaneous levels of a high-speed saw-tooth wave synchronized with the synchronous signal and of a sweep voltage of a cathode-ray tube appropriately attenuated or amplified. A sampled output of an input signal sampled by the delayed pulses is displayed on the screen of a cathode-ray tube by the use of the sweep voltage. In accordance with the feature of this invention, an attenuation circuit and a mode switch are provided. The attenuation circuit further attenuates the sweep voltage before application to the delay pulse generator. The mode switch switches, for the delayed pulse generator, two paths of the sweep voltage in one of which the attenuation circuit is provided. Accordingly, the time base of a displayed wave form can be varied to a normal state and to a magnified state in response to switching of the mode switch.

The principle, construction, and operations of this invention will be better understood from the following more detailed description taken in conjunction with the accompanying drawings, in which the same or equivalent parts are designated by the same reference numerals, characters, and symbols, and in which:

FIG. 3 is a block diagram illustrating another embodiment of this invention having a dual-trace circuit;

FIG. 4 is a block diagram illustrating another embodiment of this invention, in which a magnified wave form is clearly distinguished from a normal wave form on the screen of a cathode-ray tube;

FIG. 6 shows times charts explanatory of the operations of this invention.

Figure 1:
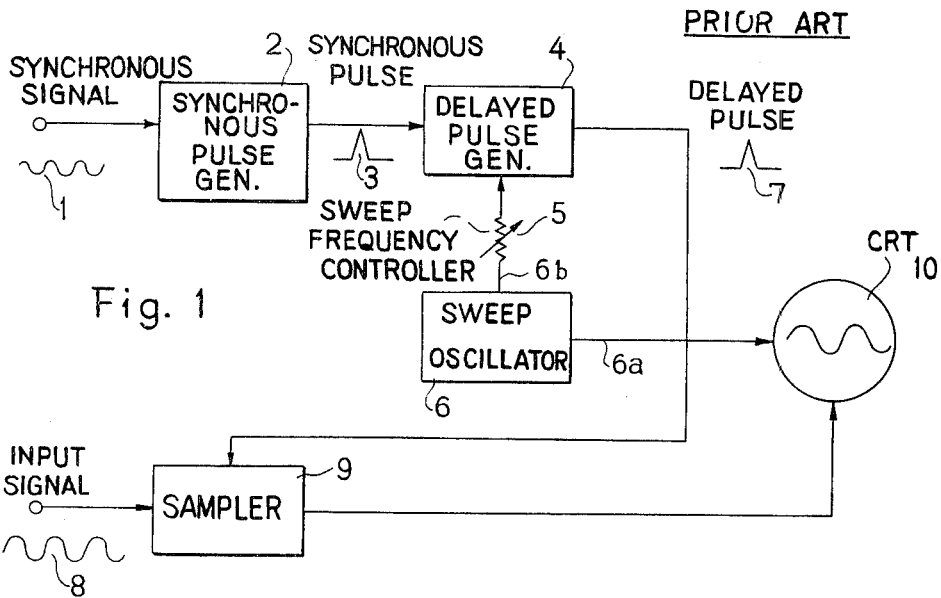
FIG. 1 is a block diagram illustrating an example of a conventional sampling oscilloscope with means for magnifying a part of an observed wave form along the time base.

To make diferences between conventional art and this invention clear, a fundamental circuit for a conventional sampling oscilloscope will first be described with reference to FIG. 1. In FIG. 1, a synchronous signal 1 used to synchronize with an input signal 8 to be observed is applied to a synchronous pulse generator, 2, which generates synchronous pulses 3. The synchronous pulses 3 are applied to a high-speed saw-tooth wave generator in a delayed pulse generator 4 so as to generate a high-speed saw-tooth wave in synchronism with the synchronous pulses 3. A properly attenuated or amplified output signal 6b of a sweep oscillator 6 is applied, through a sweep frequency controller 5 or a level controller such as a variable resistor or an AGC amplifier, to the delayed pulse generator 4, so that an output of the sweep frequency controller 5 is compared with the instantaneous level of the high-speed saw-tooth wave. Accordingly, the delayed pulse generator 4 generates delayed pulses 7 having intervals each equal to the period of the synchronous pulses 3 as regulatable time. An output 6a of the sweep oscillator 6 applied to a cathode-ray tube 10 has the same wave form as the output 6b of the sweep oscillator 6 applied to the sweep frequency controller 5. The delayed pulses 7 are applied to a sampler 9, in which the input signal 8 to be observed is sampled by sampling pulses synchronized with the delayed pulses 7. A sampled value is held until an immediately succeeding sampling time slot so as to obtain a converted signal. Accordingly, the converted output of the sampler 9 has a wave form similar to the wave form of the output signal but has a frequency sufficiently lower than the frequency of the input signal. This converted output of the sampler 9 is applied to vertical deflection terminals of the cathode-ray tube 10. The sweep frequency of the cathode-ray tube 10 is determined in accordance with the slope of the high-speed saw-tooth wave and the amplitude of the output 6b of the sweep oscillator 6. If it is assumed that the slope of the high-speed saw-tooth wave is constant, the sweep frequency of the cathode-ray tube 10 can be fundamentally increased in accordance with decrease of the amplitude of the output 6b of the sweep oscillator 6.

Accordingly, if the amplitude 6b of the sweep oscillator 6 is attenuated before the sweep frequency controller 5 or by the sweep frequency controller 5 only, an observed wave form is magnified along the time base on the screen of the cathode-ray tube 10. However, a magnified position on an observed wave from cannot be exactly known in the conventional circuit.

Figure 2:
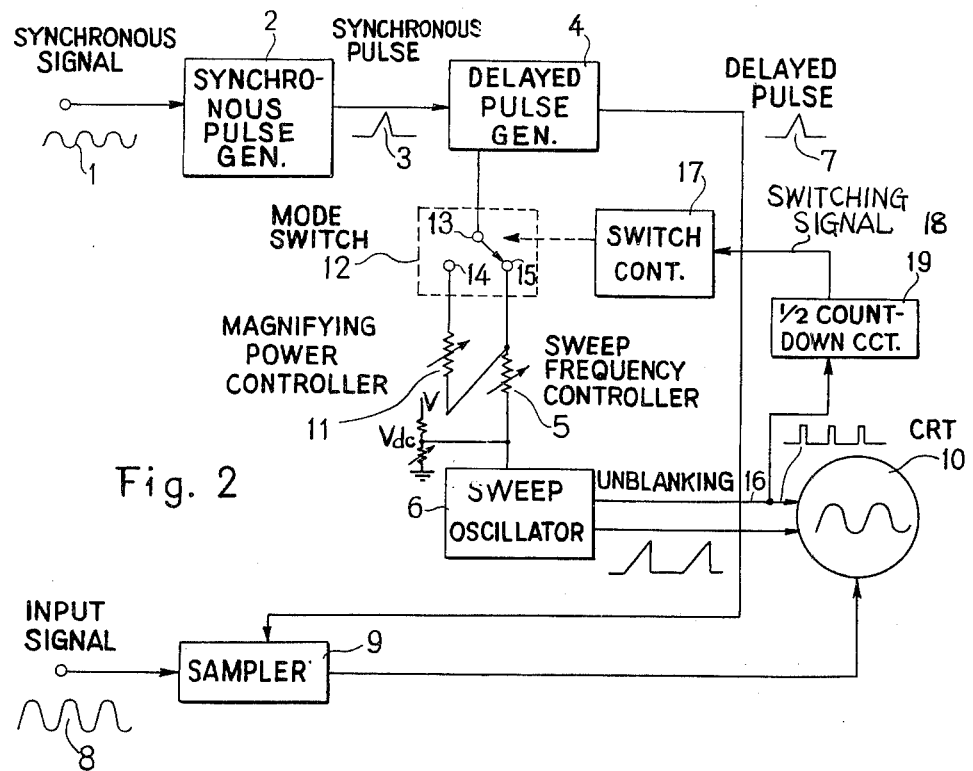
FIG. 2 is a block diagram illustrating an embodiment of this invention.

An embodiment of this invention capable of eliminating the above defect of the conventional art will be now described with reference to FIG. 2. In this embodiment, synchronous means including the synchronous pulse generator 2, delayed pulse generator means including the delayed pulse generator 4, the sweep frequency controller 5, the sweep oscillator 6, sampling means including the sampler 9 and the cathode-ray tube assembly including horizontal sweep means and vertical shift means and cathode-ray tube 10 are the same as corresponding circuits 2 to 10 in the example shown in FIG. 1. Moreover, attenuation means comprising a magnifying power controller 11 such as a variable resistor, switching means comprising a mode switch 12, switch control means including a switch controller 17, and a one-half count-down circuit 19 are further provided.

Operations in circuits 2 to 10 are performed in the manner similar to the example shown in FIG. 1. In other words, a high-speed saw-tooth wave 4a and the output 6b of the sweep oscillator 6 are compared with each other with respect to their instantaneous levels as mentioned below, so that the delayed pulses 7 are generated from the delayed pulse generator 4 to sample an input signal 8 in the sampler 9. The converted wave form of the input signal 8 can be observed on the screen of display means including the cathode-ray tube 10 as mentioned above. The above operations are performed in a case where the common terminal 13 of the mode switch 12 is connected to a terminal 15.

Figure 5:
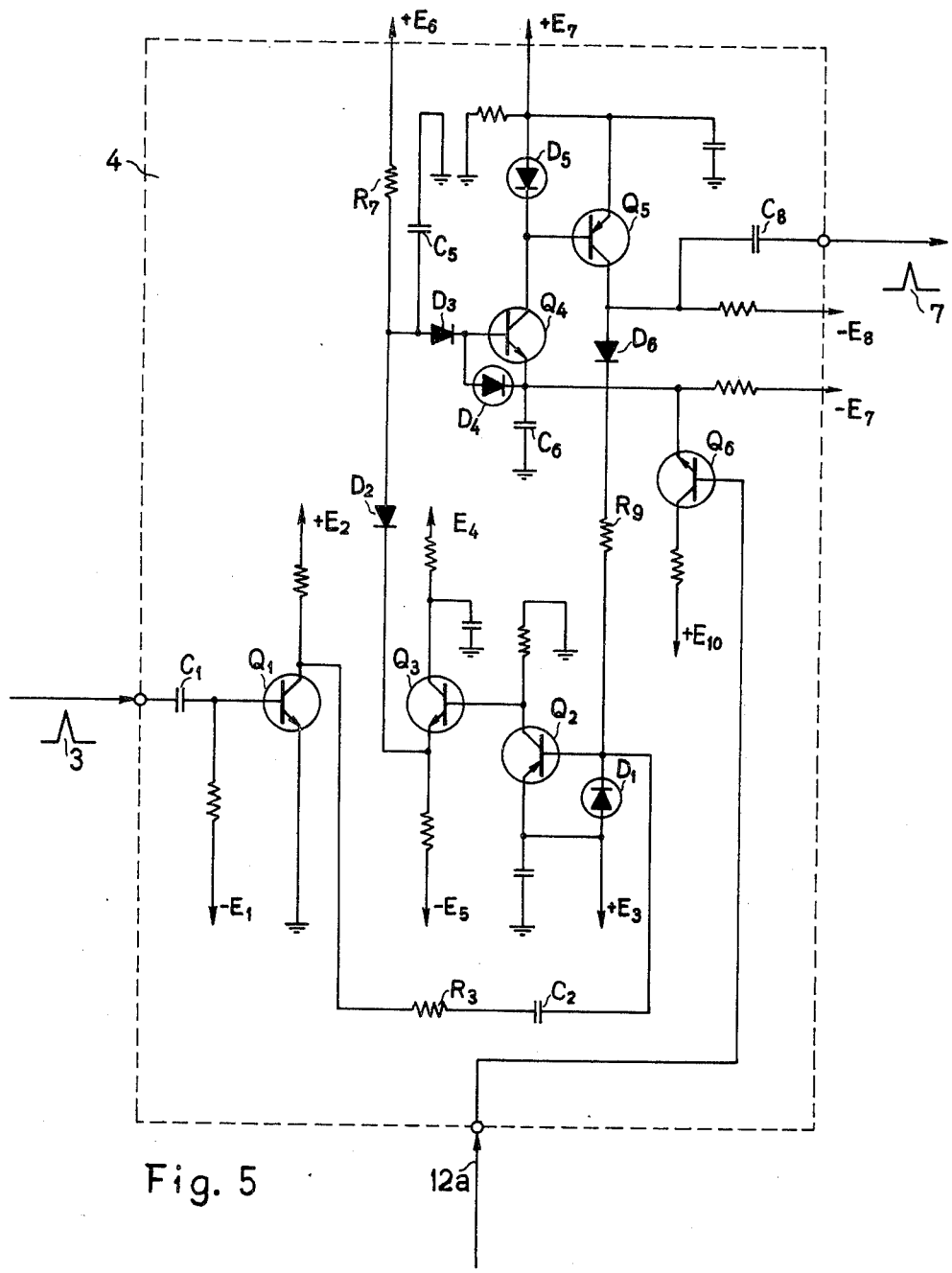
FIG. 5 is a circuit diagram illustrating an example of a delayed pulse generator employed in this invention.

With reference to FIGS. 5 and 6, the construction and operations of an example of the delayed pulse generator 4 will be further described for ready understand of this invention. When a synchronous pulse 3 is applied to a transistor $Q_1$ through a capacitor $C_1$ from the synchronous pulse generator 2, the cut-off transistor $Q_1$ is turned to the conductive state so that a negative going pulse is generated from the collector of the transistor $Q_1$. This negative going pulse is applied to a cut-off tunnel diode $D_1$ through a resistor $R_3$ and a capacitor $C_2$, so that the tunnel diode $D_1$ is turned to the conductive state while a cut-off transistor $Q_2$ is also turned to the conductive state to raise the voltage of the base of a transistor $Q_3$ from zero to a voltage $+E_3$. Accordingly, a conducting diode $D_2$ is cut-off while a capacitor $C_5$ is charged by a dc voltage $+E_6$ through a resistor $R_7$ to linearly increase the charged voltage as shown by a waveform $4a$ in FIG. 6. On the other hand, a waveform $12a$ obtained from the sweep frequency controller 5 is applied to the base of a transistor $Q_6$. A waveform similar to the waveform $12a$ is obtained at the emitter of the transistor $Q_6$ and then applied to the emitter of a transistor $Q_4$ as shown in FIG. 6 by the waveforms $4a$ and $12a$. When an instantaneous level of the waveform $4a$ reaches an instantaneous level of the waveform $12a$, a cut-off diode $D_3$ becomes conductive, so that a tunnel diode $D_4$ and the transistor $Q_4$ are turned-ON. Then, since a diode $D_5$ becomes conductive in response to a collector current of the transistor $Q_4$, a transistor $Q_5$ set so as to have an operation resion in the avalanche region thereof becomes conductive so that a delayed pulse (e.g. a pulse $P_1$) is obtained through a capacitor $C_8$. This delayed pulse is applied, through a diode $D_6$ and a resistor $R_9$, to the diode $D_1$ and the transistor $Q_2$ to cut-off them while the transistor $Q_3$ and the diode $D_2$ become conductive. As mentioned above, a delayed pulse train 7 of pulses $P_1, P_2, \ldots P_n$ having successive delay times $t_d, 2t_d, \ldots nt_d$ are obtained through the capacitor $C_8$.

In a case where the converted wave form of the input signal 8 is to be observed after magnification with respect to a desired time position on the time base of the screen of the cathode-ray tube 10, the output $6b$ of the sweep oscillator 6 is further attenuated by the magnifying power controller 11 under a condition where a level of the output $6b$ corresponding to the desired time position is used as a center so as to suit a desired magnifying power. If the center of the magnification is to be coincident with the most left start point of the time base on the screen of the cathode-ray tube 10, the magnifying power controller 11 is adjusted so that the output $6b$ of the sweep oscillator 6 assumes zero when the beam of the cathode-ray tube 10 is located at the most left start point on the screen of the cathode-ray tube 10. If the center of the magnification is to be shifted to the right hand direction on the screen, a suitable variable dc voltage $V_{dc}$ is superimposed on the output $6b$ of the sweep oscillator 6 with the other outputs applied to the cathode-ray assembly having no dc bias voltage.

The output $6b$ attenuated, by one the magnifying power-th, in the magnifying power controller 11 passes through terminals 14 and 13 of the mode switch 12 and is applied to the delayed pulse generator 4 to generate the above mentioned delayed pulses 7. If the delay time unit (one-half $t_d$) of the delayed pulses 7 is one half the above mentioned unit ($td$) at a period T2, the magnifying power is controlled by decreasing the amplitude of saw-tooth wave $12a$ by the controller 11 as shown in FIG. 6.

If the magnifying power is sufficiently increased, the observed position is sometimes obscure due to drift and jitter. Accordingly, the mode switch 12 must be again switched after restoration to the original state for confirmation of the magnifying position on the converted signal to be observed. To eliminate this defect, the switch controller 17 is provided so as to control the mode switch 12. In a normal case, terminals 13 and 14 of the mode switch 12 are connected to each other by the switch controller 17. However, if a part of the converted signal (i.e.; the output of the sampler 9) is to be observed in a magnified scale of time, the common terminal 13 of the mode switch 12 is alternately switched to terminals 14 and 15 by the switch controller 17 in response to a switching signal 18 mentioned below.

The mode switch 12 may be provided in mechanical construction such as a relay or electronic construction such as selectively opened gates. The switching signal 18 may be a signal having an appropriate repetition frequency. If the screen of the cathode-ray tube 10 is repeatedly swept by the use of a staircase wave, a return line is usually eliminated. In this case, an unblanking signal 16 is applied to a one-half countdown circuit 19 to produce the switching signal 18. Accordingly, a normal wave form and a magnified wave form are alternately observed on the screen of the cathode-ray tube 10.

With reference to FIG. 3, another embodiment of this invention provides a dual-trace circuit comprising samplers $9a$ and $9b$ and a mode switch 23. The samplers $9a$ and $9b$ respectively sample input signals 8 and 22. Respective converted outputs of the samplers $9a$ and $9b$ are applied to the mode switch 23 such as a pair of gates, which alternately switches the respective outputs of the samplers $9a$ and $9b$ by the use of a switching signal 18 applied from a switching signal generator 24. In this case, the switching signal 18 controls the switch controller 17 to obtain a normal wave form and a magnified wave form on the screen of the cathode-ray tube 10 as mentioned above. The input signals 8 and 22 are usually the same.

In a case of alternately observing a normal wave from and a magnified wave form on the screen of the cathode-ray tube 10, the two wave forms are indicated in a superimposed condition. To eminilate such defect, another embodiment of this invention shown in FIG. 4 is provided. In this embodiment, a switching signal 18 from a switching signal generator 24 is also applied to the cathode-ray tube 10 as a blanking signal 26 or an unblanking signal 26 to differentiate respective brightness of the two wave forms on the screen of the cathode-ray tube 10. Moreover, the switching signal 18 may be further applied to a vertical position switch 27 provided in the high voltage circuit of the cathode-ray tube 10 to shift the beam of the cathode-ray tube 10 in the vertical direction in synchronism with the above-mentioned switching of the normal wave form and the magnified wave form. This may be also applied to the embodiment shown in FIG. 3.

What I claim is:

1. A sampling oscilloscope, comprising:
   a cathode-ray tube display assembly having horizontal sweep means for changing the horizontal position of a displayed waveform in response to external signals applied thereto and vertical shift means for changing the vertical position of a displayed waveform in response to external signals applied thereto;
   a sweep oscillator connected to said horizontal sweep means of the cathode-ray tube display assembly for generating a sweep voltage signal;
   synchronous means for generating synchronous pulses having a controllable constant period;
   variable attenuation means connected to the output of the sweep oscillator for attenuating the sweep voltage, said variable attenuation means comprising means responsive to control signals for controlling the attenuation of said variable attenuation means in response to said control signals;
   a delayed pulse generator connected to the output of said variable attenuation means and said synchronous means and including means for generating a high-speed saw-tooth wave in synchronism with said synchronous pulses and means for comparing respective instantaneous levels of said high-speed saw-tooth wave with the output of the variable attenuation means and for generating a pulse each time the compared instantaneous levels of the high-speed saw-tooth wave and the output of said variable attenuation means are equal;
   input means for receiving an input signal;
   first sampling means connected to said input means and said delay pulse generator for sampling the input signal in response to the pulses developed by said delay pulse generator to produce a first converted signal, which has a frequency lower than the frequency of the input signal and a waveform similar to the waveform of the input signal;
   means for applying said first converted signal to said vertical shift means of the cathode-ray tube display assembly;
   switch signal means for generating a switching signal;
   and switch control means connected to said means responsive to control signals and said switch signal means for automatically varying the attenuation of said variable attenuation means in response to said switching signal.

2. A sampling oscilloscope according to claim 1, further comprising means for generating an unblanking signal in synchronism with the sweep voltage and in which said switch signal means comprises a countdown circuit for counting down the unblanking signal.

3. A sampling oscilloscope according to claim 1, further comprising second input means for receiving another input signal, second sampling means connected to said second input means and said delay pulse generator to produce a second converted signal of another input signal in response to the pulses developed by said delay pulse generator and second switch means connected to said first sampling means, said second sampling means and said switch signal means for alternately applying said first converted signal and said second converted signal to said vertical shift means in response to said switching signal.

4. A sampling oscilloscope according to claim 1, further comprising means connected to the cathode-ray tube display assembly and said switch signal means for applying said switching signal to the cathode-ray tube assembly to control the brightness of the beam of the cathode-ray tube assembly in accordance with the pattern of the switching signal.

5. A sampling oscilloscope according to claim 1, further comprising means connected to the cathode-ray tube display assembly and said switch signal means for shifting the vertical position of the beam of said cathode-ray tube assembly in accordance with the pattern of said switching signal.

6. In a sampling oscilloscope for magnifying a selected portion of an observable input signal waveform along the time base comprising;
   sampling means receptive of an input signal having a given waveform and responsive to sampling pulses applied thereto for sampling voltage levels of said input signal and for developing sampled output signals proportional to respective ones of said voltage levels and having a waveform substantially similar to that of said input signal;
   a sweep oscillator for generating sweep signals;
   display means responsive to said sampled output signals and said sweep signals for displaying the waveform of said sampled output signals;
   means receptive of said sweep signals for selecting and magnifying a portion of the waveform including first variable attenuating means for controlling the sweep frequency of the displayed waveform to observe a portion thereof thereby defining a first stage of attenuation, means for selecting one portion of the observable waveform which is to be magnified, and second variable attenuating means for controlling magnification of the selected one portion of the observable waveform thereby defining a second state stage of attenuation;
   automatic switching means selectively receptive of the first attenuated sweep signal after said first stage and the second attenuated sweep signal after both stages and responsive to a switching signal applied thereto for selectively commutating between the two attenuated sweep signals and for selecting one of said two attenuated sweep signals;
   and delayed pulse generator means responsive to synchronous pulses synchronous with said input signal and receptive of the selected one of said two attenuated sweep signals from said switching means for generating sampling pulses at selectively spaced time intervals from each synchronous pulse for each sweep signal;
   whereby said display means displays said selected one portion of said observable waveform whenever said first attenuated sweep signal is selected and displays the magnification of said selected one portion whenever said second attenuated sweep signal is selected.

7. In a sampling oscilloscope according to claim 6, further comprising means for generating said switching signal synchronous with a integral fraction of the frequency of said sweep signals.

8. In a sampling oscilloscope according to claim 6, wherein said display means comprises means responsive to said switching signal for changing the brightness of one displayed waveform thereby better distinguishing said one waveform from the other waveform.

9. In a sampling oscilloscope according to claim 6, wherein said display means comprises means responsive to said switching signal for changing the vertical position of one displayed waveform thereby better distinguishing said one waveform from the other waveform.

10. In a sampling oscilloscope according to claim 6, further comprising second sampling means receptive of a second input signal having a given waveform and responsive to said sampling pulses for sampling voltage levels of said second input signal and for developing second sampled output signals proportional to respective ones of said voltage levels and having a waveform substantially similar to that of said second input signal; second switching means selectively receptive of said first-mentioned sampled output signals and said second sampled output signals and responsive to said switching signal applied thereto for selectively commutating between the two sampled output signals and for selecting the corresponding sampled output signal; and wherein said display means comprises means receptive of said output of said second switching means for simultaneously displaying both sampled output waveforms.

* * * * *